July 17, 1951 M. A. GOLDBERGER 2,560,945
INFANT'S CRIB
Filed May 21, 1945 2 Sheets-Sheet 1
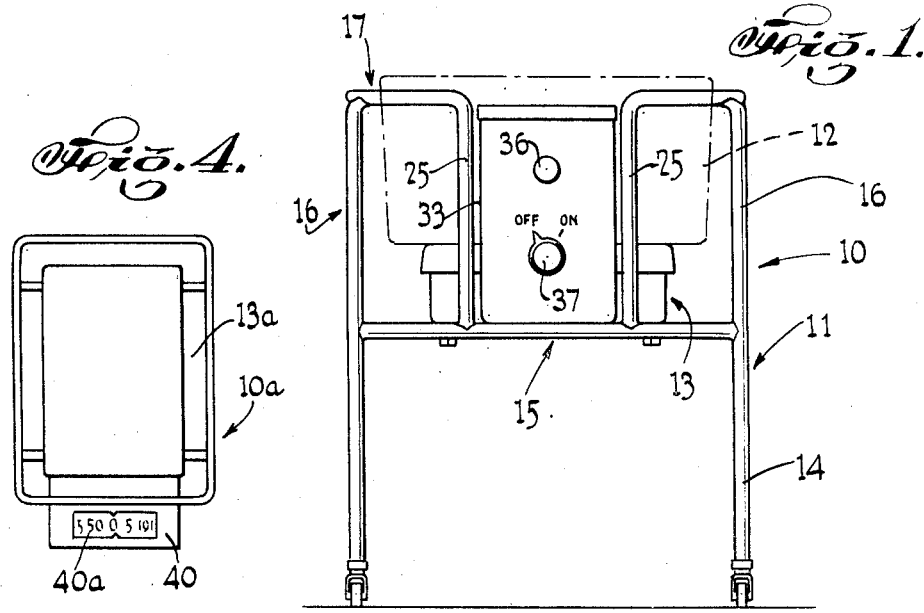
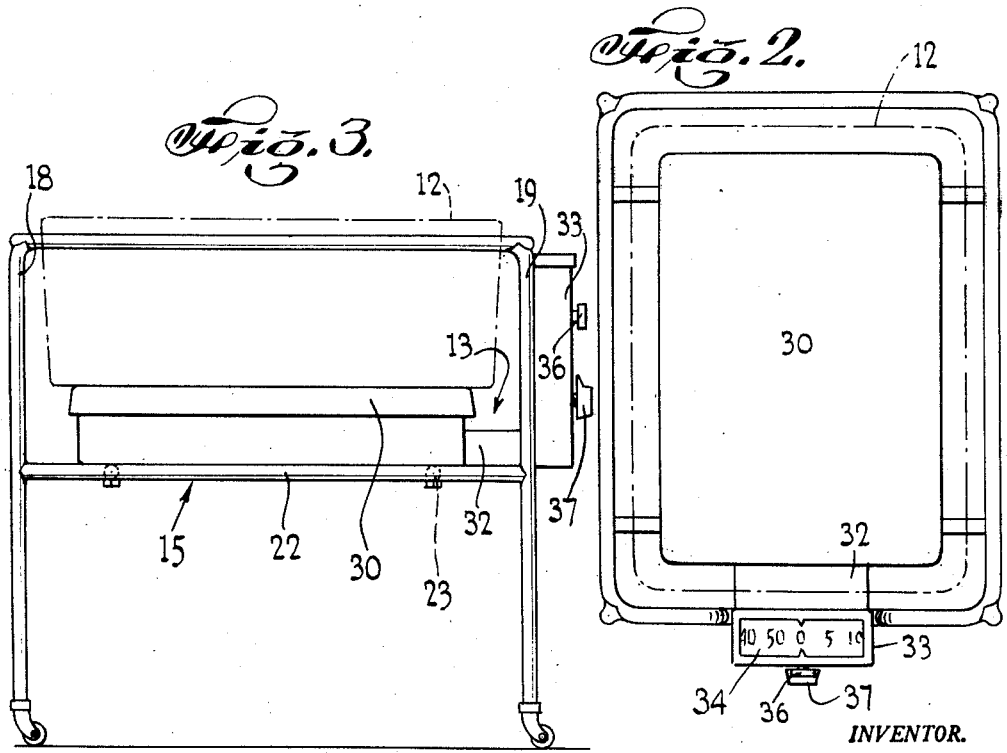
INVENTOR.
MORRIS A. GOLDBERGER
BY
J. B. Feldman
ATTORNEY July 17, 1951 M. A. GOLDBERGER 2,560,945
INFANT'S CRIB
Filed May 21, 1945 2 Sheets-Sheet 2
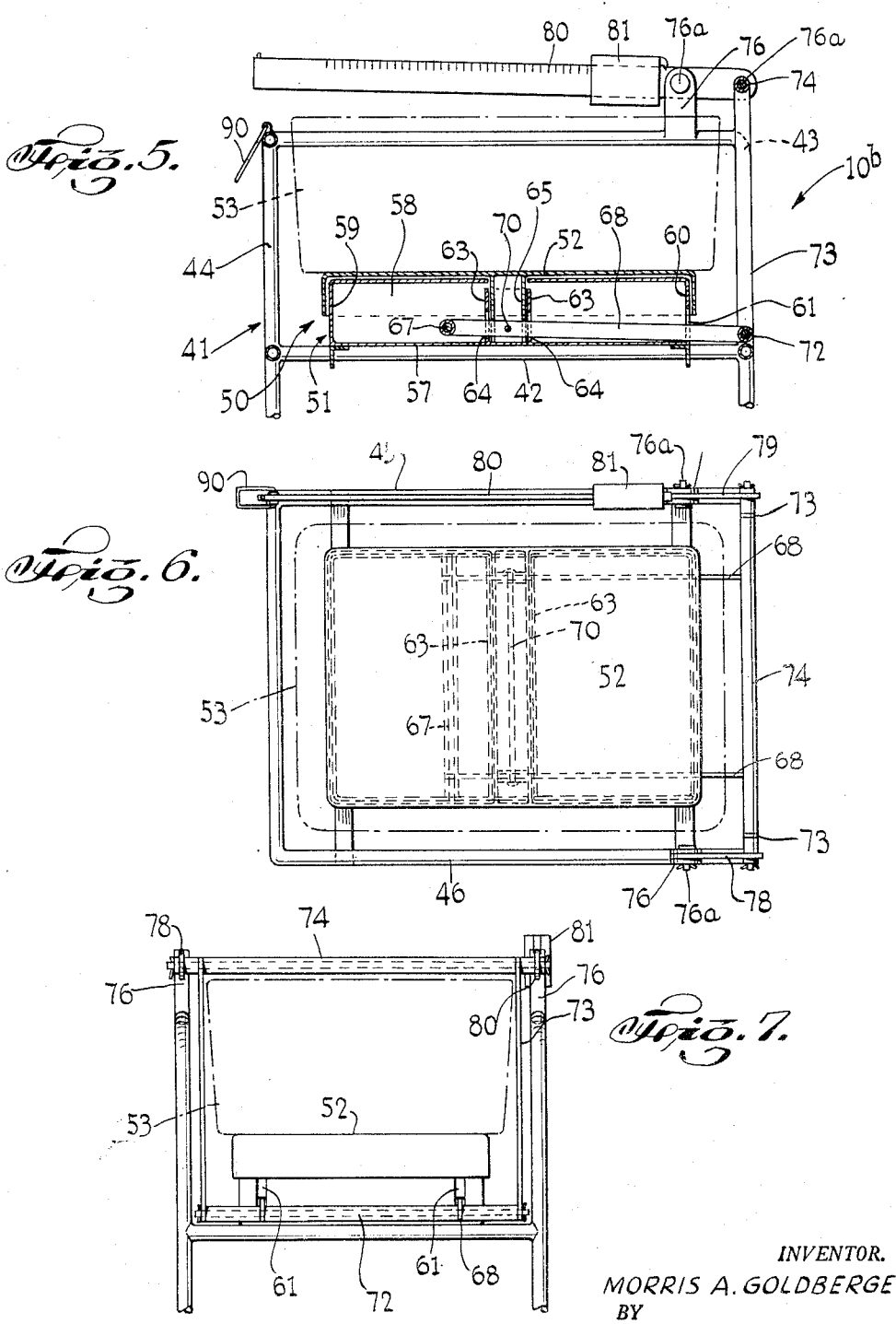
INVENTOR.
MORRIS A. GOLDBERGER
BY
J. B. Felshin
ATTORNEY Patented July 17, 1951

2,560,945

UNITED STATES PATENT OFFICE 2,560,945

INFANT'S CRIB

Morris A. Goldberger, New York, N. Y.

Application May 21, 1945, Serial No. 594,951

3 Claims. (Cl. 5—93)

This invention relates to infants' cribs.

In hospitals new born babies are placed on a scale to be weighed. This practice often proves to be the means of infecting the babies. It is therefore an object of this invention to provide a crib comprising a supporting stand or frame, a basket supported within the frame, and a weighing device on the frame and below the basket. The weighing device is so arranged that it may be read easily by the nurse or doctor so that the baby does not have to be taken out of the basket or away from the crib to be weighed on a common scale. In other words, each baby remains in his own crib and can be weighed at any time.

A further object of this invention is to provide in a device of the character described, releasable means to lock the weighing device so that the weight will only show when the weighing device is unlocked.

Another object of this invention is to provide a crib of the character described wherein the scale may be read from the front end of the crib.

Still another object of this invention is to provide in a crib of the character described, means to adjust the weighing device so that the scale will read "0" when the basket and the bed clothes are on the weighing device, so that the reading on the weighing device will be the weight of the infant.

Still another object of this invention is to provide a strong and durable construction of the character described which shall be relatively inexpensive to manufacture, and yet practical and efficient to a high degree.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the following claims.

In the accompanying drawing, in which is shown various possible illustrative embodiments of this invention, Fig. 1 is a front elevational view of a crib embodying the invention;

Fig. 2 is a top plan view thereof;

Fig. 3 is a side plan view of the crib;

Fig. 4 is a top plan view of the crib embodying the invention and illustrating a modified construction;

Fig. 5 is a side elevational view of a crib embodying the invention and illustrating another modified form thereof;

Fig. 6 is a top plan view of the structure shown in Fig. 5; and

Fig. 7 is an end view of the structure shown in Fig. 5.

Referring now in detail to the drawing, 10 designates a crib embodying the invention. The same comprises a frame or stand 11, a basket 12 within the frame to receive the baby, and a weighing device 13 on the frame and interposed between the frame and the basket to support the basket.

The frame 11 is provided with legs 14. It has a bottom wall 15, side walls 16, a rear end wall 18, and front end wall 19. The bottom 15 may comprise side rods 22 and supporting transverse rods 23. The front wall 17 has spaced portions 25 forming a space therebetween open at the top for the purpose hereinafter appearing.

The weighing device 13 rests on the bottom wall 15. It may be supported by the transverse rods 23. The weighing device 13 has a flat platform 30 covering a major portion of the bottom of the frame so as to amply support the basket 12. Weighing device 13 has a forward extension 32 from which there extends upwardly a casing 33 located between the spaced rods 25. The weighing device is provided with a dial 34 at the upper end of casing 33, which may be read by looking down. Said dial is located at the front of the crib and adjacent the top of the frame.

On the front wall of the casing is a knob 36 which may be used for adjusting the scale to "0" to balance the weight of the basket without the infant. Such adjusting means is well known in the art.

There may furthermore be mounted on the front wall, a knob 37 for locking the weighing device to render it inoperative. A turn of the handle will, of course, release the lock so that the scale can operate. The lock may be released when the infant is to be weighed. The basket 12 rests on the platform 30 between the side walls 16 and between the front and rear walls 18, 19.

The operation of the device will now be understood. The infant is first taken out of the basket and the weighing device set at "0" to balance the weight of the basket and the bed clothes thereon. The infant is then placed into the basket and the weight of the infant noted on the scale at 34. Of course, once the weighing device is balanced for the basket, the infant may be weighed at any time by turning the handle 37. With such construction, it is not necessary to take the infant out to a common weighing device where other babies are weighed, and such practice prevents infection of babies.

In Fig. 4 there is shown a crib 10a somewhat similar to crib 10. In the crib 10a the weighing device 13a is formed with an extension 40 projecting forwardly through an opening in the frame. The extension 40 is provided with a dial 40a at its upper side.

In Figs. 5, 6 and 7 there is shown a crib 10b embodying the invention. The crib 10b comprises a frame 41 having a bottom wall 42, front and end walls 43, 44 and side walls 45, 46. On the bottom wall 42 is a scale 50. The basket 53 is within the frame and rests on the scale. The scale 50 comprises a casing 51 and a top movable platform 52 on which the basket 53 rests. The casing 51 comprises a bottom wall 57, side walls 58, a rear wall 59, and a front wall 60. The front wall 60 is formed with a pair of slots or openings 61. Fixed to the bottom wall 57 are a pair of parallel transverse upwardly extending guides 63 formed with slots 64 aligned with the slots 61. Fixed to the platform 52 and extending downwardly therefrom is a member 65 slidable between the guides 63. Interconnecting the side walls 58 of the casing 51 is a transverse pivoted rod 67 located rearwardly of guides 65. Pivoted to said rod are a pair of horizontal parallel links 68 passing through the slots 64 and 61 and projecting beyond the front end of the weighing device. The links 68 are interconnected by a transverse pin 70 which is located between guides 63 and also pivoted to member 65. The front ends of the links 68 are interconnected by a transverse rod 72. Connected to the ends of rods 72 are vertical, upwardly extending links 73. The links 73 are interconnected at their upper ends by a transverse rod 74.

The side walls of the frame are each provided with a pair of upwardly extending bifurcated ears 76, carrying a transverse pivot pin 76a The pivot pin 76a on the ears 76 of side walls 46 is interconnected to one end of rod 74 by a link 78. Pin 76a on the ears of side wall 45 is interconnected to the opposite end of rod 74 by a link 79. Pivoted to the last-mentioned pivot pin 76a and to rod 74 is a scale balance arm 80. Slidable on the balance arm 80 is a poise 81. The infant in the basket may be weighed by moving the poise 81 on the balance arm 80. The balance arm may be graduated to balance the weight of the basket and the bed clothes. If desired, a link 90 may be pivoted to one end of side wall 45 to engage the outer end of the balance arm to lock the same. The link may be slipped off the balance arm when it is desired to weigh the infant.

It will thus be seen that there is provided a device in which the several objects of this invention are achieved, and which is well adapted to meet the conditions of practical use.

As various possible embodiments might be made of the above invention, and as various changes might be made in the embodiments above set forth, it is to be understood that all matter herein set forth or shown in the accompanying drawing is to be interpreted as illustrative and not in a limiting sense.

Having thus described my invention, I claim as new and desire to secure by Letters Patent:

1. A crib comprising, in combination, a frame having a bottom wall and side walls, a platform weighing device on the bottom wall, a balance arm pivoted to one of the side walls, linkage means to connect the balance arm to the platform weighing device, said balance arm being disposed above one of the side walls, and running lengthwise thereof.

2. A crib comprising, in combination, a frame having a bottom wall and side walls, a platform weighing device on the bottom wall, a balance arm pivoted to one of the side walls, linkage means to connect the balance arm to the platform weighing device, said balance arm being disposed above one of the side walls, and running lengthwise thereof, said platform weighing device having its platform disposed below the upper surface of the frame, and a basket on the platform and disposed within the frame.

3. A crib comprising, in combination, a frame having a bottom wall and side walls, a platform weighing device on the bottom wall, a balance arm pivoted to one of the side walls, linkage means to connect the balance arm to the platform weighing device, said balance arm being disposed above one of the side walls, and running lengthwise thereof, said platform weighing device having its platform disposed below the upper surface of the frame, a basket on the platform and disposed within the frame, and means to lock said balance arm

MORRIS A. GOLDBERGER.

REFERENCES CITED

The following references are of record in the file of this patent:

UNITED STATES PATENTS

| Number | Name | Date |
|---|---|---|
| 11,622 | Stevens | Aug. 29, 1854 |
| 51,091 | Shedd et al. | Nov. 21, 1865 |
| 519,593 | Seaberg | May 8, 1894 |
| 786,081 | Witek | Mar. 28, 1905 |
| 792,447 | Perotti | June 13, 1905 |
| 1,134,675 | Forbes | Apr. 6, 1915 |
| 1,639,121 | Weber | Aug. 16, 1927 |
| 2,082,076 | Myron | June 1, 1937 |

FOREIGN PATENTS

| Number | Country | Date |
|---|---|---|
| 679,489 | Germany | Aug. 7, 1939 |